(12) United States Patent
Wu

(10) Patent No.: US 10,976,449 B2
(45) Date of Patent: Apr. 13, 2021

(54) PHOTODETECTING DEVICE

(71) Applicant: InnoLux Corporation, Miao-Li County (TW)

(72) Inventor: Chih-Hao Wu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 124 days.

(21) Appl. No.: 16/452,898

(22) Filed: Jun. 26, 2019

(65) Prior Publication Data

US 2020/0033485 A1    Jan. 30, 2020

(30) Foreign Application Priority Data

Jul. 25, 2018    (CN) .......................... 201810824139.6

(51) Int. Cl.
*G01T 1/20*    (2006.01)

(52) U.S. Cl.
CPC .................. *G01T 1/2018* (2013.01)

(58) Field of Classification Search
CPC ......... H01L 24/14603; H01L 24/14641; H01L 24/14612
See application file for complete search history.

(56) References Cited

U.S. PATENT DOCUMENTS

| 7,265,327 | B1* | 9/2007 | Park | H01L 27/14603 |
| | | | | 250/208.1 |
| 2010/0253614 | A1* | 10/2010 | Chen | G09G 3/3406 |
| | | | | 345/102 |
| 2019/0216415 | A1* | 7/2019 | Wojcik | A61B 6/4411 |

* cited by examiner

*Primary Examiner* — Yara B Green
(74) *Attorney, Agent, or Firm* — McClure, Qualey & Rodack, LLP

(57) ABSTRACT

A photodetecting device is provided. The photodetecting device includes an array substrate. The first scan line extends in a first direction. The first data line extends in a second direction, wherein first data line is crossed with the first scan line. The first electronic unit is electrically connected to the first scan line and the first data line. The second electronic unit is adjacent to the first electronic unit and is disposed along the first direction. The third electronic unit is adjacent to the first electronic unit and is disposed along the second direction. The common line transmits a signal to the first electronic unit, the second electronic unit and the third electronic unit. The common line is disposed between the first electronic unit and the second electronic unit, or between the first electronic unit and the third electronic unit.

10 Claims, 13 Drawing Sheets

PHOTODETECTING DEVICE

CROSS REFERENCE TO RELATED APPLICATIONS

This Application claims priority of China Patent Application No. 201810824139.6, filed on Jul. 25, 2018, the entirety of which is incorporated by reference herein.

BACKGROUND OF THE INVENTION

Field of the Invention

The disclosure generally relates to photodetecting device, and more particularly, to photodetecting device technology in which adjacent electronic units in a photodetecting device have common lines.

Description of the Related Art

Photodetecting devices are universally applied in life, offices, schools and medical facilities. As the technology has progressed, the required detection accuracy of photodetecting devices has increased (e.g. by increasing the signal to noise ratio). Therefore, more transistors or traces need to be disposed in the photodetecting device to increase detection accuracy. However, these transistors or traces may take up more space in the array substrate, and as a result, the space that remains for disposing the photodiode will be diminished, and detection sensitivity will suffer. Therefore, in the disclosure, a photodetecting device in which the adjacent electronic units have common lines is provided to overcome the problem of having too little space to dispose the photodiode.

BRIEF SUMMARY OF THE INVENTION

An embodiment of the disclosure provides a photodetecting device. The photodetecting device comprises an array substrate. The array substrate comprises a first scan line, a first data line, a first electronic unit, a second electronic unit, a third electronic unit and a common line. The first scan line extends in a first direction. The first data line extends in a second direction, wherein the first data line is crossed with the first scan line. The first electronic unit is electrically connected to the first scan line and the first data line. The second electronic unit is adjacent to the first electronic unit and is disposed along the first direction. The third electronic unit is adjacent to the first electronic unit and is disposed along the second direction. The common line transmits a signal to the first electronic unit, the second electronic unit and the third electronic unit. The common line is disposed between the first electronic unit and the second electronic unit, or between the first electronic unit and the third electronic unit.

Other aspects and features of the disclosure will become apparent to those with ordinary skill in the art upon review of the following descriptions of specific embodiments of the photodetecting device.

BRIEF DESCRIPTION OF THE DRAWINGS

The disclosure will become more fully understood by referring to the following detailed description with reference to the accompanying drawings, wherein.

DETAILED DESCRIPTION OF THE INVENTION

In the disclosure, the description "a first element is disposed on a second element" may mean that the first element directly contacts the second element, or mean that there are other elements disposed between the first element and the second element.

The shape or size (e.g. width, length, thickness) of each element shown in figures of the disclosure is merely for illustrating the disclosure, but the disclosure should not be limited thereto. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
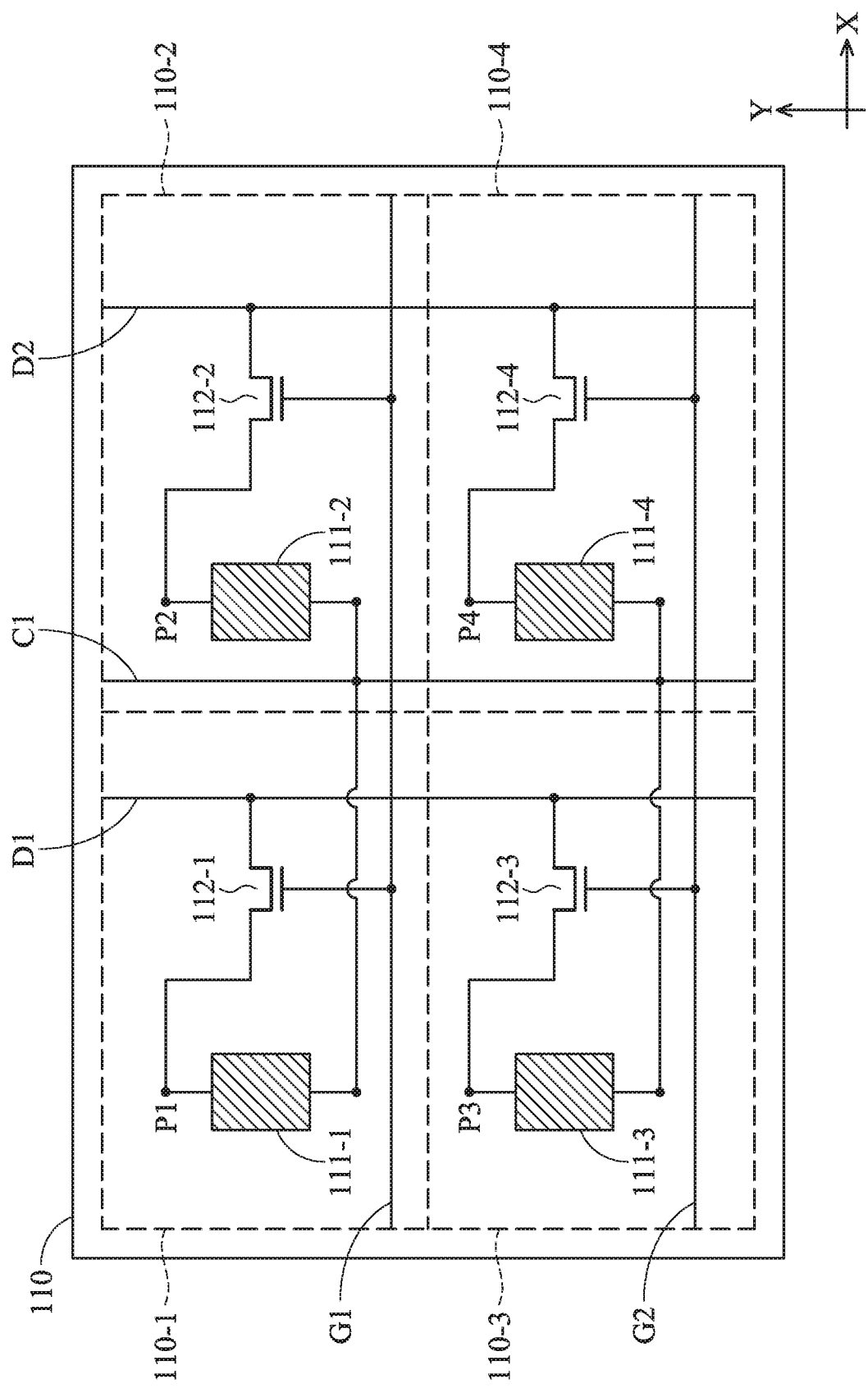
FIG. 1 is a schematic diagram of a photodetecting device 1 according to an embodiment of the disclosure.

FIG. 1 is a schematic diagram of a photodetecting device 1 according to an embodiment of the disclosure. The photodetecting device 1 may be a passive pixel sensor (PPS) structure. The photodetecting device 1 may comprise an array substrate 110. The array substrate 110 may comprise a plurality of electronic units (or pixel units). As shown in dashed part of FIG. 1, the array substrate 110 may comprise a first electronic unit 110-1, a second electronic unit 110-2, a third electronic unit 110-3 and a fourth electronic unit 110-4. The array substrate 110 may further comprise a first scan line (or gate line) G1, second scan line (or gate line) G2, a first data line (or readout line) D1, a second data line (or readout line) D2, and a bias line C1. Specifically, the first scan line G1 and the second scan line G2 are disposed along a second direction Y, and the first data line D1 and the second data line D2 are disposed along a first direction X. The first electronic unit 110-1 is electrically connected to the first scan line G1 and the first data line D1. The second electronic unit 110-2 is adjacent to the first electronic unit 110-1 and is disposed along the first direction X. The third electronic unit 110-3 is adjacent to the first electronic unit 110-1 and is disposed along the second direction Y. It should be noted that, in order to clarify the concept of the disclosure, FIG. 1 presents a simplified diagram in which partial electronic units, scan lines, data lines are shown. However, the disclosure should not be limited to what is shown in FIG. 1. The photodetecting device 1 may also comprise other elements. The photodetecting device 1 may comprise other numbers of electronic units.

As shown in FIG. 1, the first electronic unit 110-1, the second electronic unit 110-2, the third electronic unit 110-3 and the fourth electronic unit 110-4 may respectively comprise a photodiode (e.g. a first photodiode 111-1, a second photodiode 111-2, a third photodiode 111-3 and a fourth photodiode 111-4). The first electronic unit 110-1, the second electronic unit 110-2, the third electronic unit 110-3 and the fourth electronic unit 110-4 may respectively comprise a readout transistor (e.g. a first readout transistor 112-1, a second readout transistor 112-2, a third readout transistor 112-3 and a fourth readout transistor 112-4). The readout transistors are respectively configured to control whether the signals stored in the photodiodes corresponding to the readout transistors (or the photodiodes electrically connected to the readout transistors) are read out. In each of those electronic unit, one end of the photodiode may be electrically connected to the first end (e.g. drain or source) of the corresponding readout transistor. For example, the photodiodes (e.g. the first photodiode 111-1, the second photodiode 111-2, the third photodiode 111-3 and the fourth photodiode 111-4) are electrically connected to the corresponding readout transistors (e.g. a first readout transistor 112-1, a second readout transistor 112-2, a third readout transistor 112-3 and a fourth readout transistor 112-4) respectively, and in each of those electronic unit, one end of the photodiode may be electrically connected to the first end (e.g. drain or source) of the readout transistor at a connection point (e.g. connection points P1, P2, P3 and P4), and the other end of the photodiode may be electrically to a common line, e.g. the common lime may be a bias line C1. Another end of each of the first readout transistor 112-1 and the third readout transistor 112-3 may be electrically connected to the first data line (or readoutout line) D1 and another end of each of the second readout transistor 112-2 and the fourth readout transistor 112-4 may be electrically connected to the second data line (or readoutout line) D2. The gates of the first readout transistor 112-1 and the second readout transistor 112-2 may be connected to the first scan line G1 and the gates of the third readout transistor 112-3 and the fourth readout transistor 112-4 may be connected to the second scan line G2.

According to the embodiments of the disclosure, a plurality of scan lines (e.g. first scan line G1 and the second scan line G2, but the disclosure should not be limited thereto) of the photodetecting device 1 extend in a first direction X, and the scan lines are disposed in sequence along a second direction Y. In some embodiments, the first direction X is different from the second direction Y. In some embodiment, the first direction X is approximately vertical to the second direction Y. In some embodiment, an angle (e.g. 85°~45°) is between the first direction X and the second direction Y. In photodetecting device 1, the electronic units in the same row (e.g. the electronic units disposed along the first direction X) may be electrically connected to the same scan line. As shown in FIG. 1, the first electronic unit 110-1 and the second electronic unit 110-2 are electrically connected to the first scan line G1, and the third electronic unit 110-3 and the fourth electronic unit 110-4 are electrically connected to the second scan line G2. In addition, a plurality of data lines (e.g. first data line D1 and the second data line D2, but the disclosure should not be limited thereto) of the photodetecting device 1 extend in the second direction Y, and the data lines are disposed in sequence along the first direction X. The data lines are crossed with the scan lines each other. In photodetecting device 1, the electronic units in the same column (e.g. the electronic units disposed along the second direction Y) may be electrically connected to the same data line. As shown in FIG. 1, the first electronic unit 110-1 and the third electronic unit 110-3 are electrically connected to the first data line D1, and the second electronic unit 110-2 and the fourth electronic unit 110-4 are electrically connected to the second data line D2.

In addition, in the embodiment, a plurality of electronic units (e.g. the first electronic unit 110-1, the second electronic unit 110-2, the third electronic unit 110-3 and the fourth electronic unit 110-4) may share a bias line C1. For example, the first electronic unit 110-1, the second electronic unit 110-2, the third electronic unit 110-3 and the fourth electronic unit 110-4 may share a line, wherein the line may be the bias line C1, but the disclosure should not be limited thereto.

Figure 2:
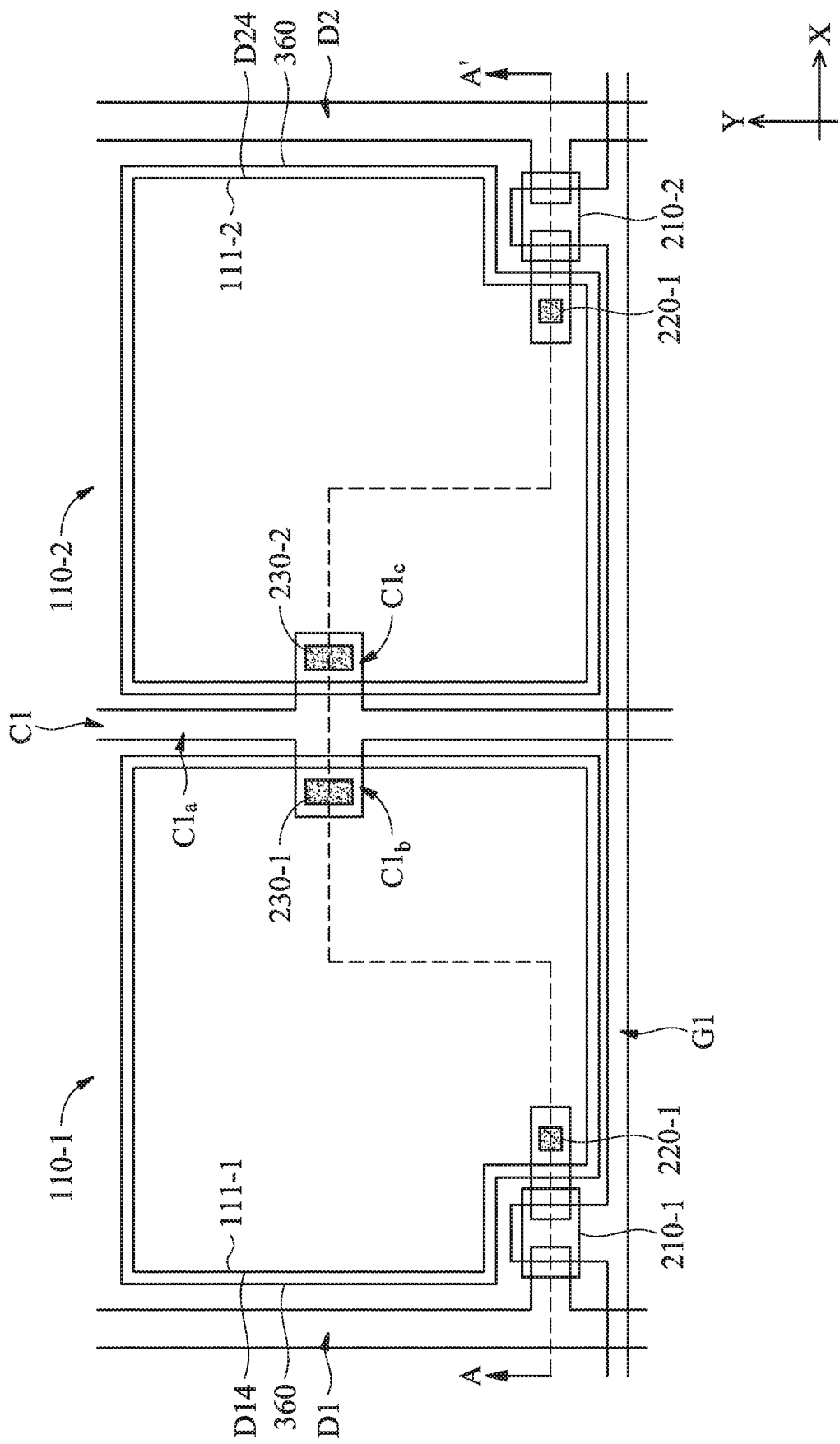
FIG. 2 is a top view diagram of two adjacent electronic units of the photodetecting device 1 according to an embodiment of the disclosure.

FIG. 2 is a top view diagram of two adjacent electronic units (e.g. the first electronic unit 110-1 and the second electronic unit 110-2) of the photodetecting device 1 according to an embodiment (e.g. the embodiment of FIG. 1) of the disclosure. FIG. 2 shows the first scan line G1, the first data line D1, the second data line D2 and the bias line C1. The common line (e.g. bias line C1) is disposed between the first electronic unit 110-1 and the second electronic unit 110-2. In the embodiment, because the common line (e.g. bias line C1) extends in the second direction Y, the first electronic unit 110-1 and the second electronic unit 110-2 are disposed between the first data line D1 and the second data line D2. In other words, the adjacent electronic units along the first direction X (e.g. the first electronic unit 110-1 and the second electronic unit 110-2) may be designed for mirror symmetry along the first direction X, but the disclosure should not be limited thereto. In some embodiments, partial elements of the first electronic unit 110-1 and the second electronic unit 110-2 may not be designed for mirror symmetry. As shown in FIG. 2, the first electronic unit 110-1 and the second electronic unit 110-2 are disposed between the first data line D1 and the second data line D2. In addition, the common line (e.g. bias line C1) may have a main part $C1_a$, a first branch part $C1_b$ and a second branch part $C1_c$. The main part $C1_a$ is connected to the first branch part $C1_b$ and the second branch part $C1_c$ and the first branch part $C1_b$ and the second branch part $C1_c$ are disposed in the two sides of the main part $C1_a$. Specifically, the main part $C1_a$ may extend in the second direction Y, the first branch part $C1_b$ may be the branch of the one sides of the main part $C1_a$, and the second branch part $C1_c$ may be the branch of the other side of the main part $C1_a$, and the first branch part $C1_b$ and the second branch part $C1_c$ may respectively correspond to the first electronic unit 110-1 and the second electronic unit 110-2. The extension directions of the first branch part $C1_b$ and the second branch part $C1_c$ may be different from the second direction Y. In some embodiments, the first branch part $C1_b$ and the second branch part $C1_c$ are disposed in both sides of the main part $C1_a$ symmetrically. In some embodiments, the first branch part $C1_b$ and the second branch part $C1_c$ are disposed in both sides of the main part $C1_a$ asymmetrically. For example, the first branch part $C1_b$ and the second branch part $C1_c$ are not disposed in the same horizontal axis (the axis is vertical to the second direction Y). In addition, from a top view of the array substrate 110, the first branch part $C1_b$ and the second branch part $C1_c$ may partially overlap the first electronic unit 110-1 and the second electronic unit 110-2, respectively. The first branch part $C1_b$ and the second branch part $C1_c$ may be electrically connected to the first electronic unit 110-1 and the second electronic unit 110-2 respectively. In some embodiments, the first branch part $C1_b$ and the second branch part $C1_c$ may be electrically connected to the first electronic unit 110-1 and the second electronic unit 110-2 respectively through contact hole 230-1 and contact hole 230-2.

Figure 3:
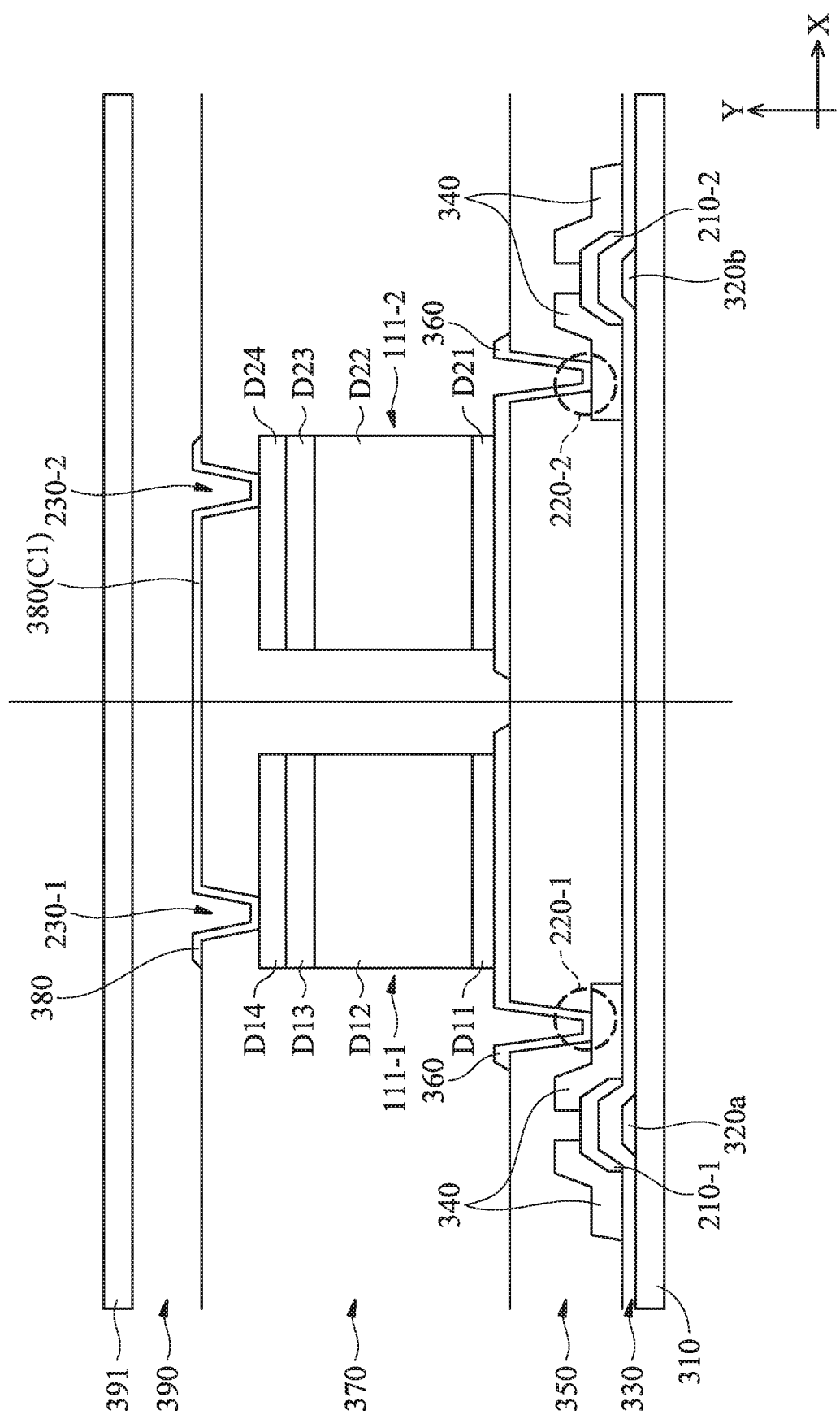
FIG. 3 is a profile diagram of the A-A' section of the two adjacent electronic units of the photodetecting device 1 according to an embodiment of the disclosure.

FIG. 3 is a profile diagram of the A-A' section (represented by dashed line) of the two adjacent electronic units (e.g. the first electronic unit 110-1 and the second electronic unit 110-2) of the photodetecting device 1 according to an embodiment of the disclosure. As shown in FIG. 3, a substrate 310 may be a glass substrate, a plastic substrate, a flexible circuit board or a printed circuit board, but the disclosure should be not limited thereto. The materials of the substrate 310 may comprise glass, quartz, organic polymer or metal, but the disclosure should be not limited thereto. The organic polymer may comprise polyimide (PI), polyethylene terephthalate (PET), or polycarbonate (PC), but the disclosure should be not limited thereto. A first metal layer 320 is formed on the substrate 310. The first metal layer 320 may be patterned (e.g. photolithography manufacturing process, etching process manufacturing process, but the disclosure should be not limited thereto) to form the gates of the readout transistors (e.g. the gate 320a of the first readout transistor 112-1 and the gate 320b of the second readout transistor 112-2), the first scan line G1, the second scan line G2 or other scan lines, but the disclosure should be not limited thereto. Then, a gate insulation layer 330 is formed on the first metal layer 320. Then, an amorphous-silicon layer 210-1 and a second metal layer 340 are formed on the gate insulation layer 330 in sequence. The second metal layer 340 may be patterned (e.g. photolithography manufacturing process, etching process manufacturing process, but the disclosure should be not limited thereto) to form the source and drain of the first readout transistor 112-1, the source and drain of the second readout transistor 112-2, the first data line D1, the second data line D2 or other data lines, but the disclosure should be not limited thereto. Then, the first interlayer dielectric (ILD) layer 350 is formed on the second metal layer 340. Then, the first ILD layer 350 is patterned to form a plurality of through holes, and a third metal layer 360 is deposited on the first ILD layer 350 in such a way that it fills in the through holes to form the contact hole 220-1 and contact hole 220-2. The third metal layer 360 is patterned to form the bottom electrode of the first photodiode 111-1 of the first electronic unit 110-1 and form the bottom electrode of the second photodiode 111-2 of the second electronic unit 110-2. The first photodiode 111-1 and the second photodiode 111-2 are formed on the third metal layer 360. Then, a second ILD layer 370 is formed on the first photodiode 111-1 and the second photodiode 111-2. The first photodiode 111-1 comprises a first semiconductor layer D11, a second semiconductor layer D12 and a third semiconductor layer D13, and the second photodiode 111-2 comprises a first semiconductor layer D21, a second semiconductor layer D22 and a third semiconductor layer D23. In some embodiments, the first semiconductor layer D11 and the first semiconductor layer D21 may be N-type doping layers, the second semiconductor layer D12 and the second semiconductor layer D22 may be intrinsic layers and the third semiconductor layer D13 and the third semiconductor layer D23 may be P-type doping layers. In some embodiments, the first semiconductor layer D11 and the first semiconductor layer D21 may be P-type doping layers and the third semiconductor layer D13 and the third semiconductor layer D23 may be N-type doping layers. A conductive layer is formed on the third semiconductor layer D13 and the third semiconductor layer D23, and the conductive layer is patterned to form the conductive layer D14 and the conductive layer D21. The conductive layer D14 and the conductive layer D21 are respectively used to be the top electrode of the first photodiode 111-1 and the top electrode of the second photodiode 111-2. The second ILD layer 370 is patterned to form a plurality of through holes, and a fourth metal layer 380 is deposited on the second ILD layer 370 in such a way that it fills in the through holes to form contact hole 230-1 and contact hole 230-2. The fourth metal layer 380 is patterned to form the bias line C1, and the bias line C1 is electrically connected to the top electrode of the first photodiode 111-1 and the top electrode of the second photodiode 111-2 respectively. Then, a third ILD layer 390 is formed on the fourth metal layer 380, and the fourth metal layer 380 is formed between the second ILD layer 370 and the third ILD layer 390. In some embodiments, the photodetecting device 1 may further comprise a scintillator layer 391. The scintillator layer 391 is adjacent to the substrate 310. Specifically, the scintillator layer 391 is formed on the third ILD layer 390. For example, when the photodetecting device 1 comprises the scintillator layer 391, the photodetecting device 1 may be regarded as an X-ray detecting device. The scintillator layer 391 may transform the X-ray into the visible light which can be received by the photodiode.

Figure 4A:
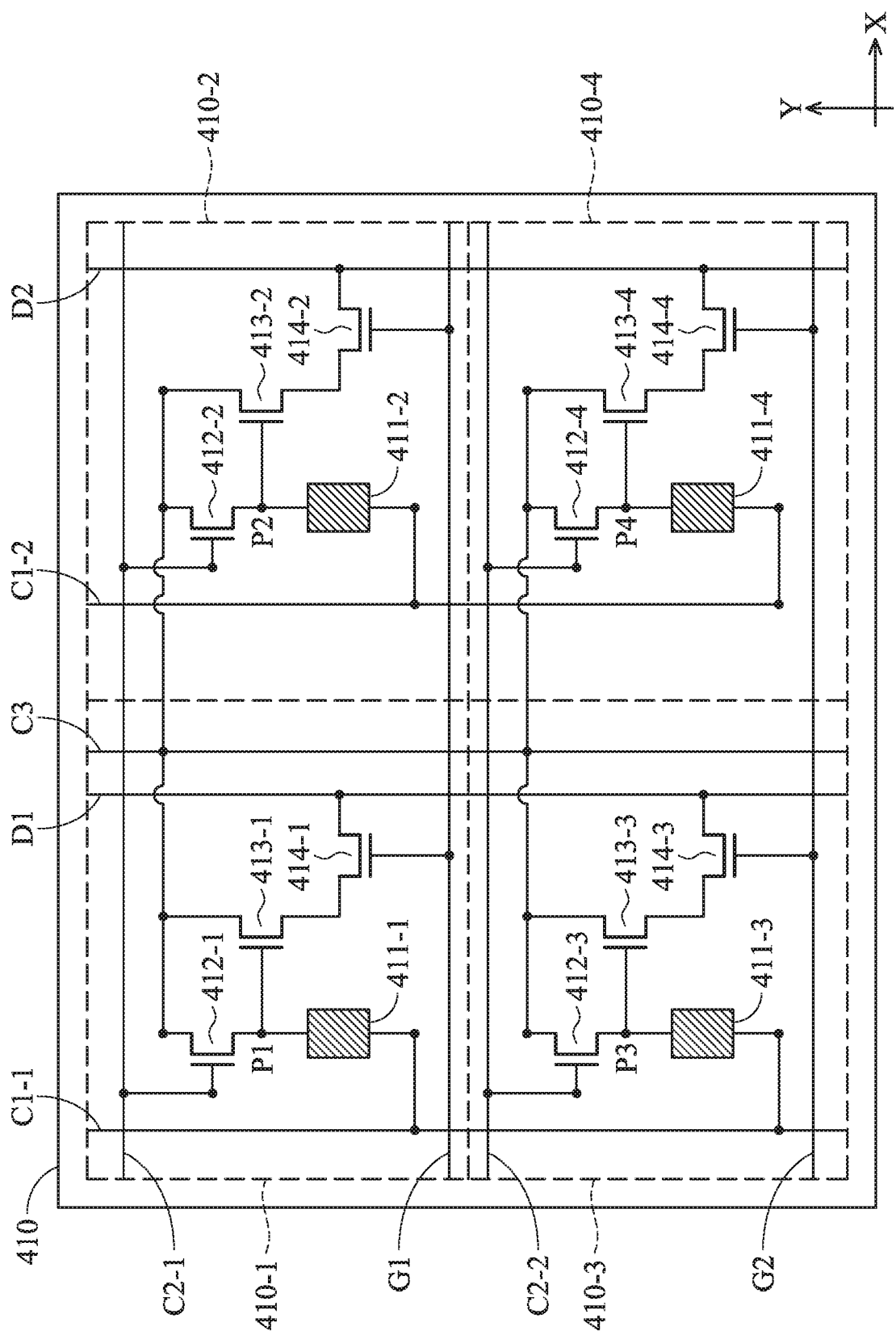
FIG. 4A is a schematic diagram of a photodetecting device 4 according to an embodiment of the disclosure.

FIG. 4A is a schematic diagram of a photodetecting device 4 according to an embodiment of the disclosure. The photodetecting device 4 may be an active pixel sensor (APS) structure. The photodetecting device 4 may comprise an array substrate 410. The array substrate 410 may comprise a plurality of electronic units (or pixel units), e.g. a first electronic unit 410-1, a second electronic unit 410-2, a third electronic unit 410-3 and a fourth electronic unit 410-4. The array substrate 410 may further comprise a first scan line (or gate line) G1, second scan line (or gate line) G2, a first data line (or readout line) D1, a second data line (or readout line) D2, a first bias line C1-1, a second bias line C1-2, a first reset gate line C2-1, a second reset gate line C2-2 and a power source voltage (Vdd) line C3. It should be noted that, in order to clarify the concept of the disclosure, FIG. 4A presents a simplified diagram in which partial electronic units, scan lines, data lines are shown. However, the disclosure should not be limited to what is shown in FIG. 4A. The photodetecting device 4 may comprise other numbers of electronic units or other elements.

As shown in FIG. 4A, the first electronic unit 410-1, the second electronic unit 410-2, the third electronic unit 410-3 and the fourth electronic unit 410-4 may respectively comprise a photodiode (e.g. the first photodiode 411-1, the second photodiode 411-2, the third photodiode 411-3, and the fourth photodiode 411-4). The first electronic unit 410-1, the second electronic unit 410-2, the third electronic unit 410-3 and the fourth electronic unit 410-4 may respectively comprise a reset transistor (e.g. the first reset transistor 412-1, the second reset transistor 412-2, the third reset transistor 412-3, and the fourth reset transistor 412-4). The first electronic unit 410-1, the second electronic unit 410-2, the third electronic unit 410-3 and the fourth electronic unit 410-4 may respectively comprise an amplification transistor (e.g. the first amplification transistor 413-1, the second amplification transistor 413-2, the third amplification transistor 413-3, and the fourth amplification transistor 413-4). Furthermore, the first electronic unit 410-1, the second electronic unit 410-2, the third electronic unit 410-3 and the fourth electronic unit 410-4 may respectively comprise a readout transistor (e.g. the first readout transistor 414-1, the second readout transistor 414-2, the third readout transistor 414-3, and the fourth readout transistor 414-4). However, the disclosure should not be limited thereto. As shown in FIG. 4A, the gate of the first reset transistor 412-1 and the gate of the second reset transistor 412-2 are electrically connected to the first reset gate line C2-1. One end of the first reset transistor 412-1 is electrically connected to one end of the first photodiode 411-1 and to the gate of the first amplification transistor 413-1 at the connection point P1. One end of the second reset transistor 412-2 is electrically connected to one end of the second photodiode 412-1 and to the gate of second amplification transistor 413-2 at the connection point P2.

Furthermore, the gate of the third reset transistor 412-3 and the gate of the fourth reset transistor 412-4 are respectively connected to the second reset gate line C2-2. Another end of the third reset transistor 412-3 is connected to one end of the third photodiode 411-3 and the gate of the third amplification transistor 413-3 at the connection point P3. Another end of the fourth reset transistor 412-4 is connected to one end of the fourth photodiode 411-4 and the gate of the fourth amplification transistor 413-4 at the connection point P4. Furthermore, another end of each of the reset transistors (e.g. the first reset transistor 412-1, the second reset transistor 412-2, the third reset transistor 412-3, and the fourth reset transistor 412-4) may be electrically connected to the same Vdd line C3. The reset transistors may be configured to respectively reset the voltages of the corresponding connection points (e.g. connection points P1-P4) or respectively change the voltages of the corresponding connection points to the initial voltages.

Furthermore, one end of each amplification transistor (e.g. the first amplification transistor 413-1, the second amplification transistor 413-2, the third amplification transistor 413-3, and the fourth amplification transistor 413-4) may be electrically connected to the corresponding to readout transistor (the first readout transistor 414-1, the second readout transistor 414-2, the third readout transistor 414-3, and the fourth readout transistor 414-4). Another end of each amplification transistor (e.g. the first amplification transistor 413-1, the second amplification transistor 413-2, the third amplification transistor 413-3, and the fourth amplification transistor 413-4) may be electrically connected to the common line (e.g. Vdd line C3). The common line may transmit a signal to the first electronic unit 410-1, the second electronic unit 410-2, the third electronic unit 410-3 and the fourth electronic unit 410-4. Specifically, the common line (e.g. Vdd line C3) may be configured to transmit a DC voltage (provided by an external circuit signal supplier) to the amplification transistors (e.g. the first amplification transistor 413-1, the second amplification transistor 413-2, the third amplification transistor 413-3, and the fourth amplification transistor 413-4) and the reset transistors (e.g. the first reset transistor 412-1, the second reset transistor 412-2, the third reset transistor 412-3, and the fourth reset transistor 412-4). In some embodiments, the signal (e.g. voltage signal) transmitted by the common line may be a positive dc bias voltage, but the disclosure should not be limited thereto. In some embodiments, the signal transmitted by the common line may be a negative dc bias voltage In addition, each amplification transistor (e.g. the first amplification transistor 413-1, the second amplification transistor 413-2, the third amplification transistor 413-3, and the fourth amplification transistor 413-4) is configured to transform the electric-charge signal stored in its corresponding photodiode (e.g. the first photodiode 411-1, the second photodiode 411-2, the third photodiode 411-3, and the fourth photodiode 411-4) into a voltage. The voltage generated by the amplification transistor may be the voltage of the gate of its corresponding readout transistor (the first readout transistor 414-1, the second readout transistor 414-2, the third readout transistor 414-3, and the fourth readout transistor 414-4).

In addition, the gates of the readout transistors (the first readout transistor 414-1, the second readout transistor 414-2, the third readout transistor 414-3, and the fourth readout transistor 414-4) may be electrically connected to the first scan line (or gate line) G1 or the second scan line G2 (e.g. the gates of the first readout transistor 414-1 and the second readout transistor 414-2 are electrically connected to the first scan line G1, and the gates of the third readout transistor 414-3 and the fourth readout transistor 414-4 are electrically connected to the second scan line G2). Furthermore, one end of each readout transistor (the first readout transistor 414-1, the second readout transistor 414-2, the third readout transistor 414-3, and the fourth readout transistor 414-4) may be electrically connected to the first data line D1 or the second data line D2 (e.g. one end of each of the first readout transistor 414-1 and the third readout transistor 414-3 is electrically connected to the first data line D1, and one end of each of the second readout transistor 414-2 and the fourth readout transistor 414-4 is electrically connected to the second data line D2). Specifically, the first scan line G1 or the second scan line G2 may receive voltage signal to enable the readout transistors (the first readout transistor 414-1, the second readout transistor 414-2, the third readout transistor 414-3, and the fourth readout transistor 414-4) which connected to the first scan line G1 or the second scan line G2. When the readout transistors are enabled, the data may be transmitted to the external circuit (not shown in figures) through the data line (e.g. first data line D1 or second data line D2) which the readout transistors correspond to (or the readout transistors connect to) to readout data (or receive data). According to the embodiment of the disclosure, a plurality of scan lines (e.g. first scan line G1 and second scan line G2, but the disclosure should not be limited thereto) of the photodetecting device 4 may extend in the first direction X. In the photodetecting device 4, the electronic units in the same row (e.g. the electronic units disposed along first direction X) may be electrically connected to the same scan line. A plurality of data lines (e.g. first data line D1 and second data line D2, but the disclosure should not be limited thereto) of the photodetecting device 4 may extend in the second direction Y. In the photodetecting device 4, the electronic units in the same column (e.g. the electronic units disposed along second direction Y) may be electrically connected to the same data line.

In addition, another end of the first photodiode 411-1 and another end of the third photodiode 411-3 may be electrically connected to the first bias line C1-1, and another end of the second photodiode 411-2 and another end of the fourth photodiode 411-4 may be electrically connected to the second bias line C1-2. The first bias line C1-1 and the second bias line C1-2 may respectively transmit a DC voltage to the photodiodes which are connected to them.

As shown in FIG. 4A, the first electronic unit 410-1, the second electronic unit 410-2, the third electronic unit 410-3 and the fourth electronic unit 410-4 may share a conductive line (e.g. Vdd line C3). In other embodiments, the first electronic unit 410-1, the second electronic unit 410-2, the third electronic unit 410-3 and the fourth electronic unit 410-4 may share other lines (e.g. bias line, reset gate line, reset power line). The configuration of adjacent electronic units which share the same line may reduce the space for disposing the line to increase the space for the photodiode and increase detection sensitivity.

Figure 4B:
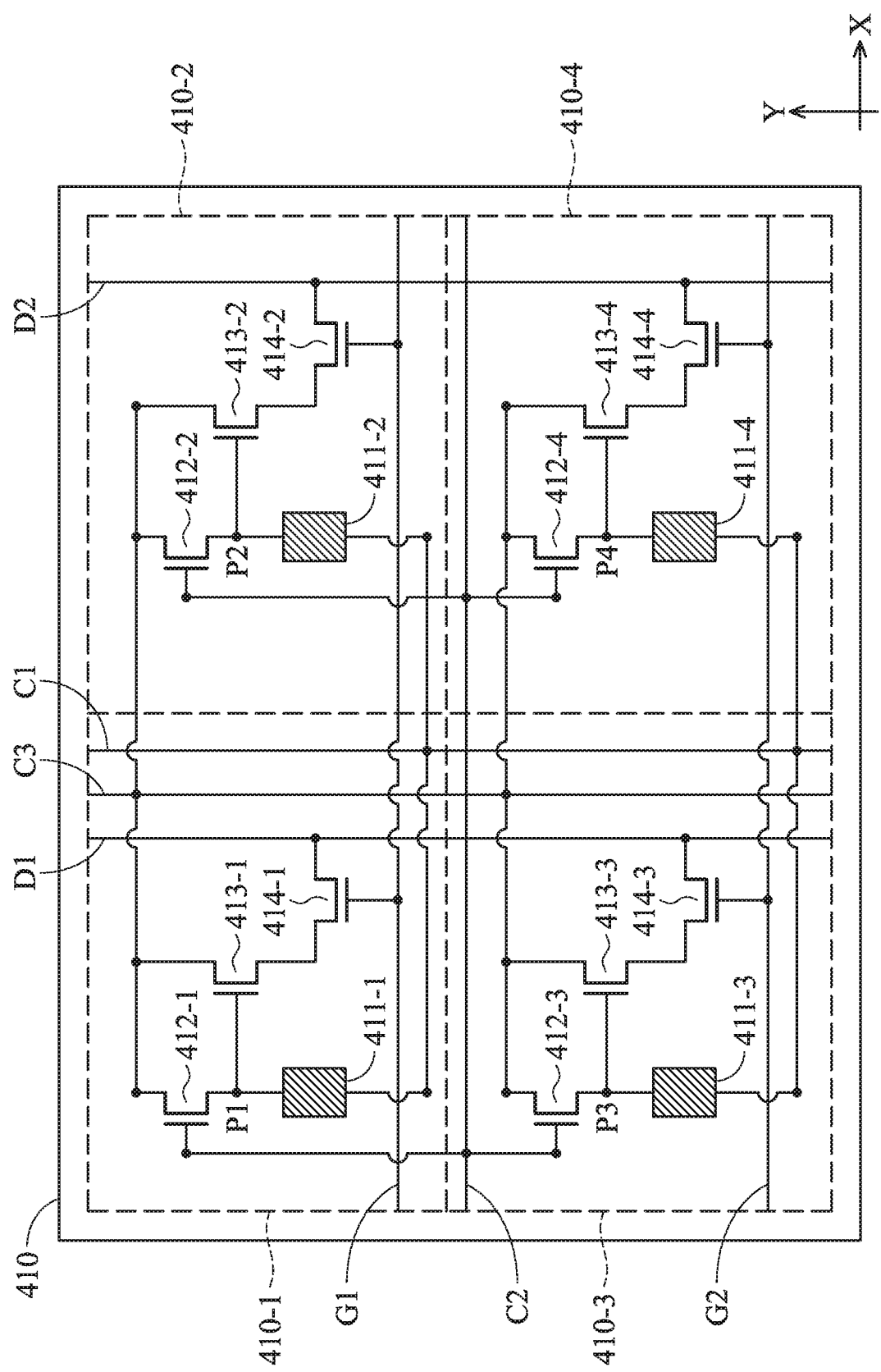
FIG. 4B is a schematic diagram of a photodetecting device 4 according to another embodiment of the disclosure.

In some embodiments, the first electronic unit 410-1, the second electronic unit 410-2, the third electronic unit 410-3 and the fourth electronic unit 410-4 may share at least one of a bias line C1, a reset gate line C2 or Vdd line C3 (i.e. may share multiple lines or all lines). In some embodiments, the first electronic unit 410-1, the second electronic unit 410-2, the third electronic unit 410-3 and the fourth electronic unit 410-4 may share a bias line C1 and a reset gate line C2. In some embodiments, the first electronic unit 410-1, the second electronic unit 410-2, the third electronic unit 410-3 and the fourth electronic unit 410-4 may share a bias line C1, a reset gate line C2 and a Vdd line C3 (as shown in FIG. 4B). In some embodiments, the first electronic unit 410-1, the second electronic unit 410-2, the third electronic unit 410-3 and the fourth electronic unit 410-4 may share a bias line C1 and a Vdd line C3.

According to another embodiment of the disclosure, as shown in FIG. 4B, the first electronic unit 410-1, the second electronic unit 410-2, the third electronic unit 410-3 and the fourth electronic unit 410-4 may share multiple lines, wherein the multiple lines may comprise the bias line C1, the reset gate line C2 and the Vdd line C3. In the photodetecting device 4 of FIG. 4B, only one bias line C1, one reset gate line C2 and one Vdd line C3 need to be disposed between the first electronic unit 410-1, the second electronic unit 410-2, the third electronic unit 410-3 and the fourth electronic unit 410-4. The connection relationships between these common lines and the electronic units may be adjusted as shown in FIG. 4B. Specifically, the gates of the first reset transistor 412-1, the second reset transistor 412-2, the third reset transistor 412-3, and the fourth reset transistor 412-4 may be electrically connected to the reset gate line C2. One end of each of the first photodiode 411-1, second photodiode 411-2, third photodiode 411-3 and fourth photodiode 411-4 may be electrically connected to the bias line C1. One end (e.g. drain or source) of each of the first reset transistor 412-1, the second reset transistor 412-2, the third reset transistor 412-3, and the fourth reset transistor 412-4 and one end (e.g. drain or source) of each of the first amplification transistor 413-1, the second amplification transistor 413-2, the third amplification transistor 413-3, and the fourth amplification transistor 413-4 may be electrically connected to the Vdd line C3. Therefore, only one bias line C1, one reset gate line C2 and one Vdd line C3 need to be disposed between the first electronic unit 410-1, the second electronic unit 410-2, the third electronic unit 410-3 and the fourth electronic unit 410-4.

Figure 5:
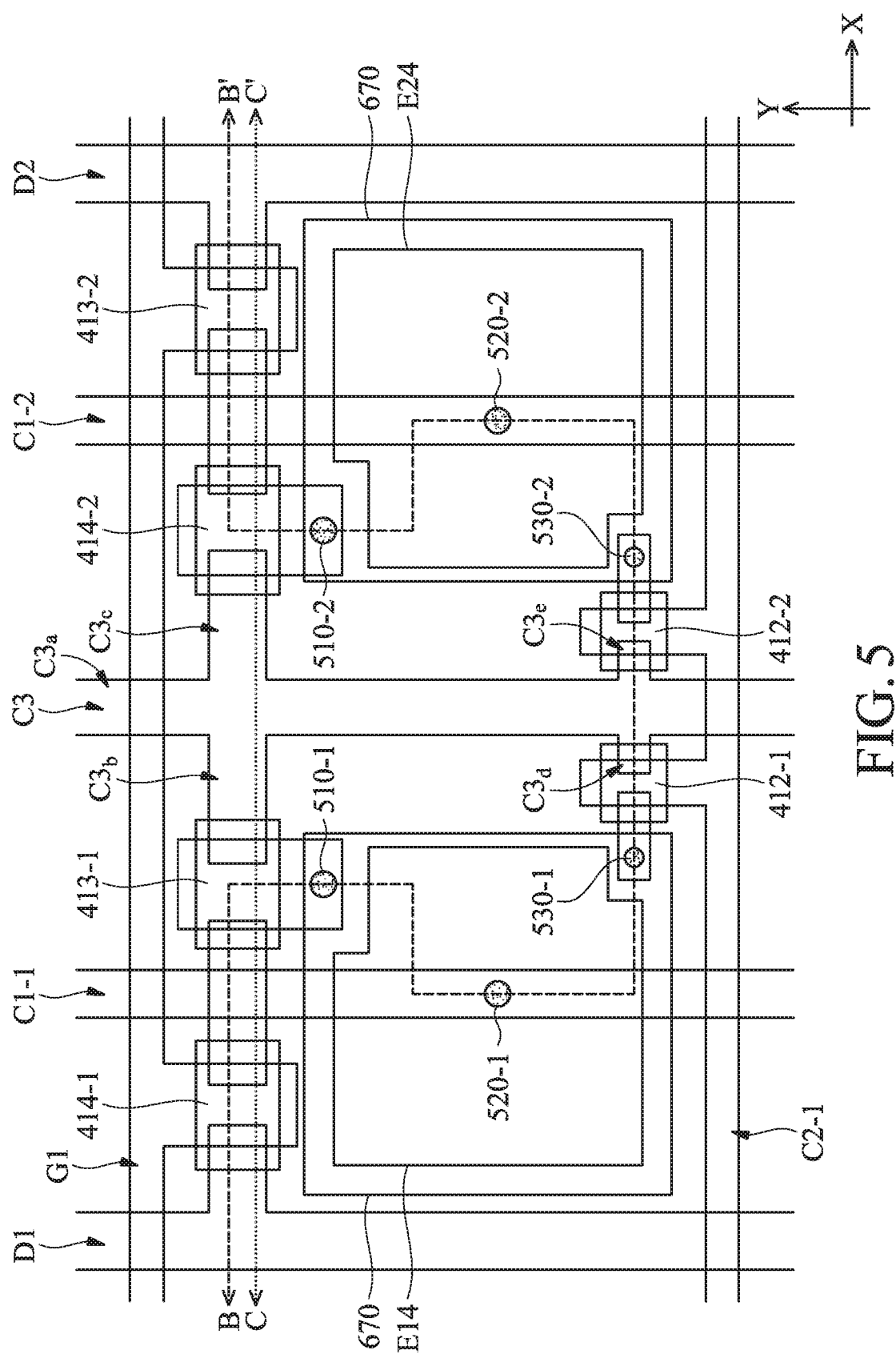
FIG. 5 is a top view diagram of two adjacent electronic units of the photodetecting device 4 according to an embodiment of the disclosure.

FIG. 5 is a top view diagram of two adjacent electronic units of the photodetecting device 4 according to an embodiment of the disclosure. As shown in FIG. 5, the first electronic unit 410-1 comprises the first photodiode 411-1, the first reset transistor 412-1, the first amplification transistor 413-1, the first readout transistor 414-1, a contact hole 510-1, a contact hole 520-1 and a contact hole 530-1. The second electronic unit 410-2 comprises the second photodiode 411-2, the second reset transistor 412-2, the second amplification transistor 413-2, the second readout transistor 414-2, a contact hole 510-2, a contact hole 520-2 and a contact hole 530-2. In the embodiments of FIG. 5, the common line (e.g. Vdd line C3) may extend in the second direction Y and the first electronic unit 410-1 and the second electronic unit 410-2 may be disposed between the first data line D1 and the second data line D2. The adjacent electronic units along the first direction X (e.g. the first electronic unit 410-1 and the second electronic unit 410-2) may be designed for mirror symmetry along the first direction X, but the disclosure should not be limited thereto.

In other embodiments, if the common line (e.g. the reset gate line C2) extends in the first direction X, the first electric unit 410-1 and the third electric unit 410-3 may be disposed between the first scan line G1 and the second line G2. The adjacent electronic units along the second direction Y (e.g. the first electronic unit 410-1 and the third electronic unit 410-3) may be designed for mirror symmetry along the second direction Y. That is to say, the adjacent electronic units along the second direction Y may be disposed between the first scan line G1 and the second line G2. It should be noted that the extension directions of different type of common lines should not be limited to figures shown in the disclosure.

Backing to FIG. 5, the Vdd line C3 may have a main part C3$_a$, a first branch part C3$_b$ and a second branch part C3$_c$. The main part C3$_a$ is connected to the first branch part C3$_b$ and the second branch part C3$_c$. From a the top view of the array substrate 410, the first branch part C3$_b$ and the second branch part C3$_c$ may partially overlap the first electronic unit 410-1 and the second electronic unit 410-2, respectively, to electrically connect the Vdd line C3 to the first electronic unit 410-1 (e.g. electrically connecting it to the first amplification transistor 413-1) and the second electronic unit 410-2 (e.g. electrically connecting it to the second amplification transistor 413-2).

According to another embodiment of the invention, if the common line (e.g. the reset gate line C2) extends in the first direction X, the first branch part and the second branch part of the common line are electrically connected to the first electronic unit 410-1 and the third electronic unit 410-3 respectively. Specifically, from a top view of the array substrate 410, the first branch part and the second branch part of the common line may partially overlap the first electronic unit 410-1 and the third electronic unit 410-3, respectively, to electrically connect the common line to the first electronic unit 410-1 and the third electronic unit 410-3. In some embodiments, the first branch part and the second branch part may be electrically connected to the first electronic unit 410-1 and to the third electronic unit 410-3 through two respective contact holes.

Referring to FIG. 5, the common Vdd line C3 may have a third branch part C3$_d$ and a fourth branch part C3$_e$. The main part C3$_a$ is connected to the third branch part C3$_d$ and the fourth branch part C3$_e$. In addition, From a top view of the array substrate 410, the third branch part C3$_d$ and the fourth branch part C3$_e$ may partially overlap the first electronic unit 410-1 and the second electronic unit 410-2, respectively, to electrically connect the Vdd line C3 to the first electronic unit 410-1 (e.g. electrically connecting it to the first reset transistor 412-1) and the second electronic unit 410-2 (e.g. electrically connecting it to the second reset transistor 412-2).

Figure 6A:
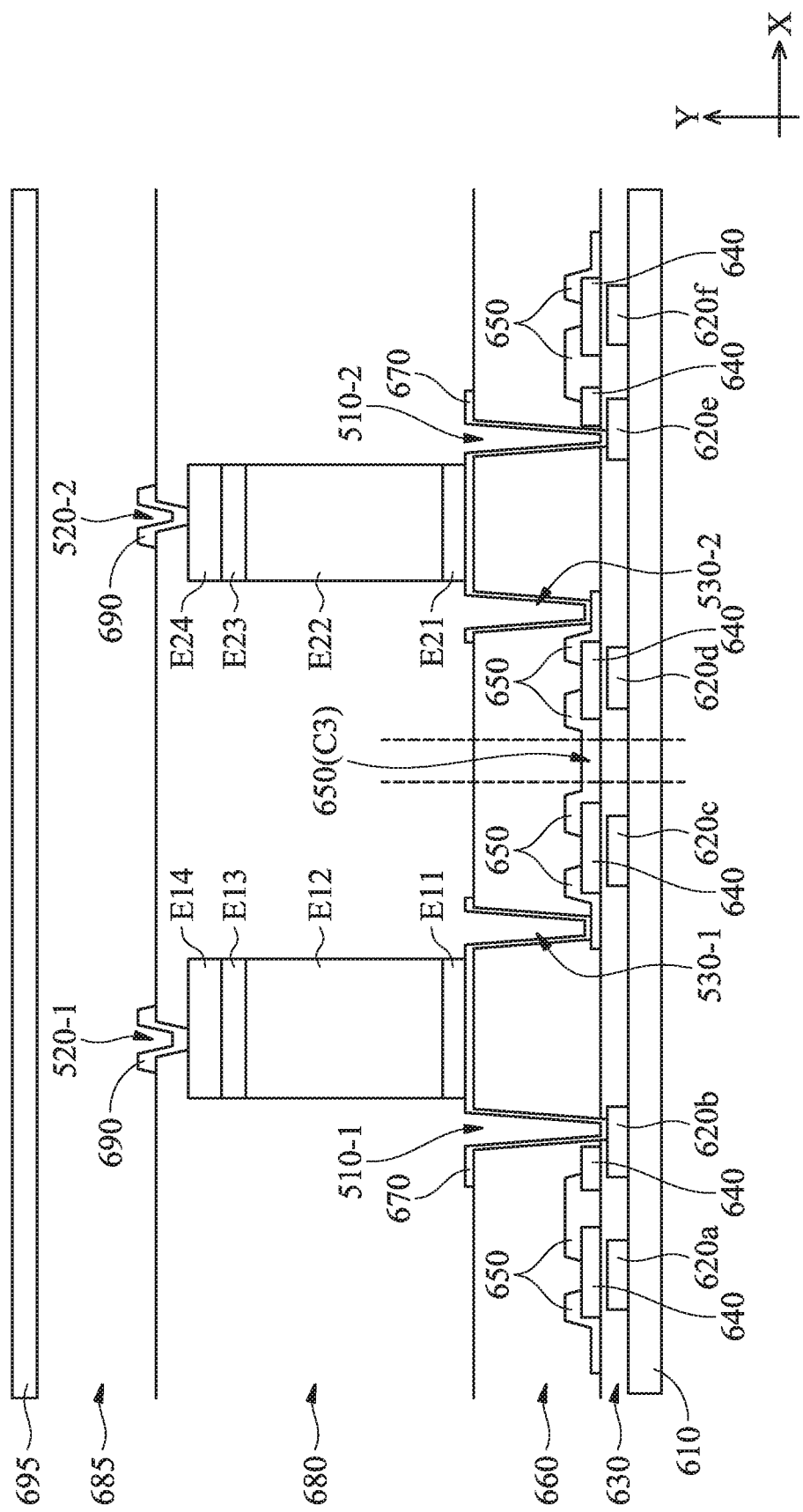
FIG. 6A is a profile diagram of the B-B' section (represented by dashed line) of the two adjacent electronic units of the photodetecting device 4 of FIG. 5 according to an embodiment of the disclosure.

FIG. 6A is a profile diagram of the B-B' section (represented by dashed line) of the two adjacent electronic units of the photodetecting device 4 of FIG. 5 according to an embodiment of the disclosure.

As shown in FIG. 6A, a first metal layer 620 is formed on the substrate 610. The first metal layer 620 may be patterned (e.g. photolithography manufacturing process, etching process manufacturing process, but the disclosure should be not limited thereto) to form a gate 620a of the first readout transistor 414-1, a gate 620b of the first amplification transistor 413-1, a gate 620c of the first reset transistor 412-1, a gate 620d of the second reset transistor 412-2, a gate 620e of the second amplification transistor 413-2, a gate 620f of the second readout transistor 414-2, the first scan line G1, the second scan line G2 or other scan lines, but the disclosure should be not limited thereto. Then, a gate insulation layer 630 is formed on the first metal layer 620. Then, an amorphous-silicon layer 640 and a second metal layer 650 are formed on the gate insulation layer 630 in sequence. The second metal layer 650 may be patterned to form the sources and drains of a plurality of transistors (which comprise the first reset transistor 412-1, the second reset transistor 412-2, the first amplification transistor 413-1, the second amplification transistor 413-2, the first readout transistor 414-1 and the second readout transistor 414-2), the Vdd line C3, the first data line D1, the second data line D2 or other data lines, but the disclosure should be not limited thereto. In other embodiments of the disclosure, the Vdd line C3 may be a conductive layer of other layers (comprising the metal layer). Then, the first interlayer dielectric (ILD) layer 660 is formed on the second metal layer 650. Then, the first ILD layer 660 is patterned to form a plurality of through holes, and a third metal layer 670 is deposited on the first ILD layer 660 in such a way that it fills in the through holes to form a plurality of contact holes (which comprise contact hole 510-1, contact hole 530-1, contact hole 510-2, and contact hole 530-2, but the disclosure should not be limited thereto). The third metal layer 670 is patterned to form the bottom electrode of the first photodiode 411-1 of the first electronic unit 410-1 and form the bottom electrode of the second photodiode 411-2 of the second electronic unit 410-2. Then, the first photodiode 411-1 and the second photodiode 411-2 are formed on the third metal layer 670. The first photodiode 411-1 may comprise a first semiconductor layer E11, a second semiconductor layer E12 and a third semiconductor layer E13 from bottom to top, and the second photodiode 411-2 may comprises a first semiconductor layer E21, a second semiconductor layer E22 and a third semiconductor layer E23 from bottom to top. In an embodiment, the first semiconductor layer E11 and the first semiconductor layer E21 may be N-type doping layers, the second semiconductor layer E12 and the second semiconductor layer E22 may be intrinsic layers and the third semiconductor layer E13 and the third semiconductor layer E23 may be P-type doping layers. A conductive layer is formed on the third semiconductor layer E13 and the third semiconductor layer E23, and the conductive layer is patterned to form the conductive layer E14 and the conductive layer E24. The conductive layer E14 and the conductive layer E24 are respectively used to be the top electrode of the first photodiode 411-1 and the top electrode of the second photodiode 411-2. Then, a second ILD layer 680 is formed on the first photodiode 411-1 and the second photodiode 411-2. The second ILD layer 680 is patterned to form a plurality of through holes, and a fourth metal layer 690 is deposited or disposed on the second ILD layer 680 in such a way that it fills in the through holes to form a plurality of contact holes (which comprise contact hole 520-1 and contact hole 520-2). Then, a third ILD layer 685 is formed on the fourth metal layer 690. In some embodiments, the photodetecting device 4 may further comprise a scintillator layer 695. The scintillator layer 690 is adjacent to the substrate 610. Specifically, the scintillator layer 695 is formed on the third ILD layer 685. For example, when the photodetecting device 4 comprises the scintillator layer 695, the photodetecting device 4 may be regarded as an X-ray detecting device. The scintillator layer 695 may transform the X-ray into the visible light which can be received by the photodiode.

Figure 6B:
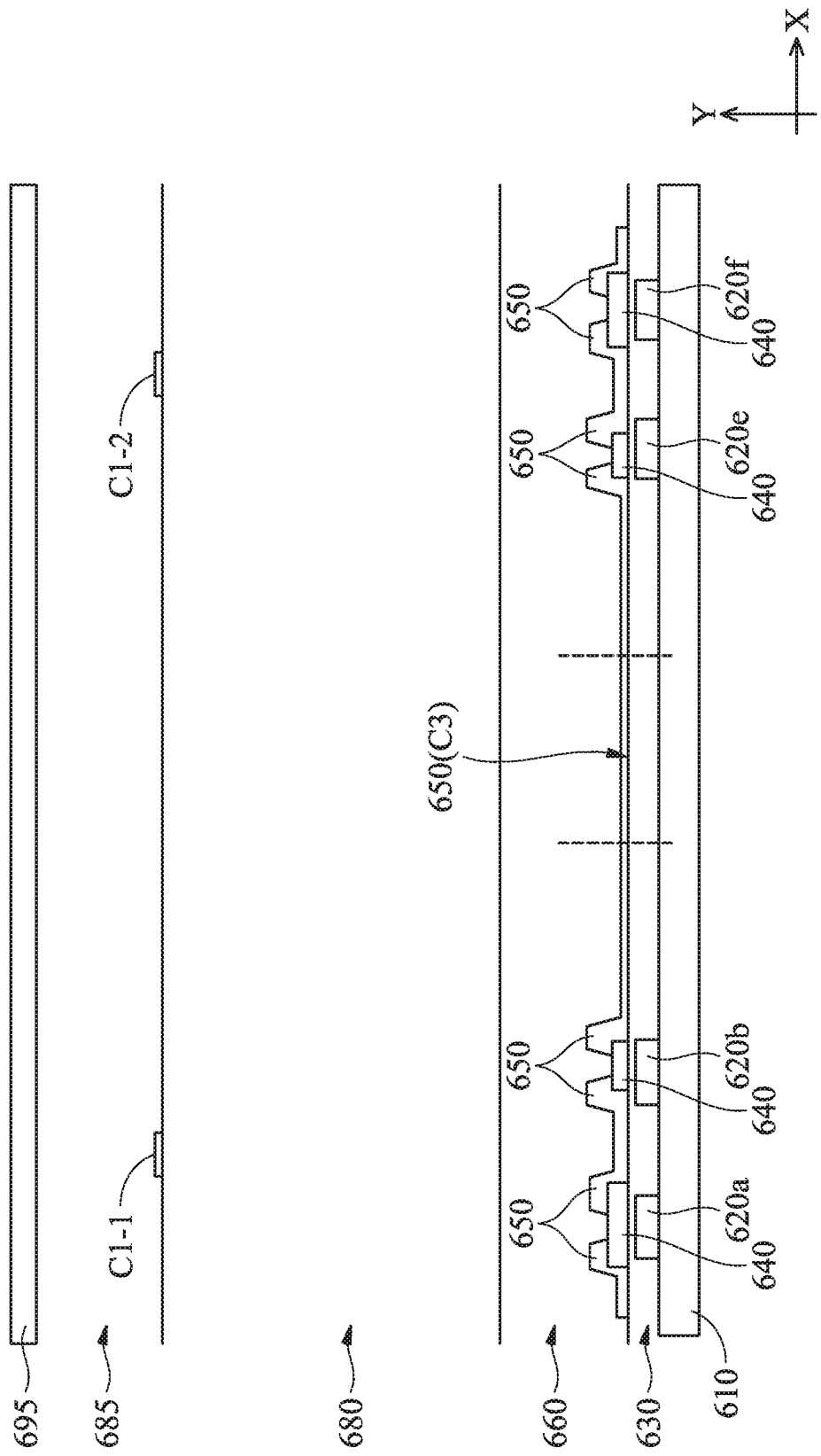
FIG. 6B is a profile diagram of the C-C' section (represented by dashed line) of the two adjacent electronic units of the photodetecting device 4 of FIG. 5 according to an embodiment of the disclosure.

FIG. 6B is a profile diagram of the C-C' section (represented by dashed line) of the two adjacent electronic units of the photodetecting device 4 according to an embodiment of the disclosure.

As shown in FIG. 6B, the first bias line C1-1 and the second bias line C1-2 are formed on the second ILD layer 680. As shown in FIG. 6B, the first electronic unit 410-1 and the second electronic unit 410-2 may share the Vdd line C3.

Figure 7A:
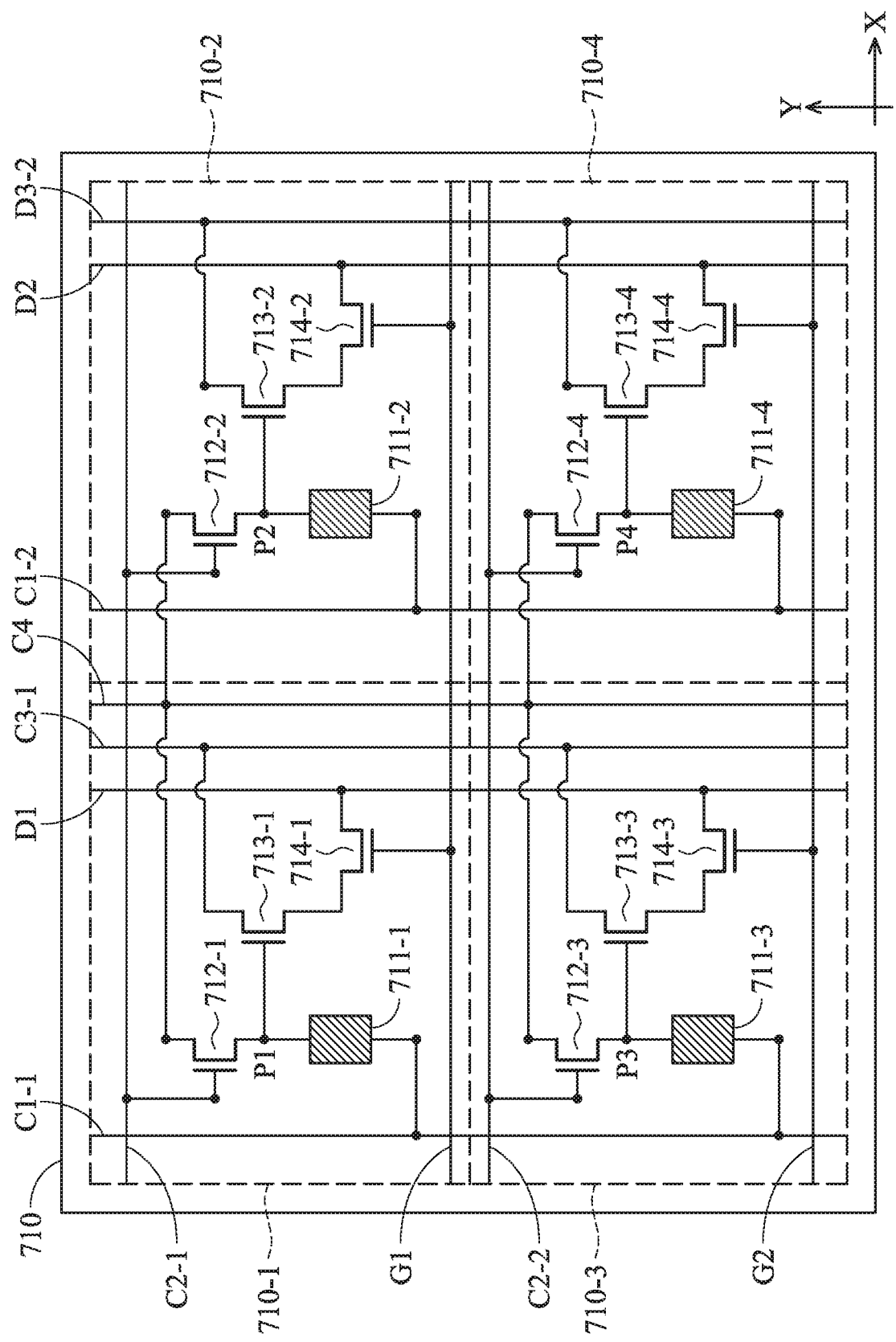
FIG. 7A is a schematic diagram of a photodetecting device 7 according to an embodiment of the disclosure.

FIG. 7A is a schematic diagram of a photodetecting device 7 according to an embodiment of the disclosure.

The photodetecting device 7 may be an active pixel sensor (APS) structure. The photodetecting device 7 may comprise an array substrate 710. The array substrate 710 may comprise a plurality of electronic units (e.g. a first electronic unit 710-1, a second electronic unit 710-2, a third electronic unit 710-3 and a fourth electronic unit 710-4), a first scan line G1, second scan line G2, a first data line D1, a second data line D2, a first bias line C1-1, a second bias line C1-2, a first reset gate line C2-1, a second reset gate line C2-2, a first Vdd line C3-1, a second Vdd line C3-2 and a voltage reset (Vreset) line C4. It should be noted that, in order to clarify the concept of the disclosure, FIG. 7A presents a simplified diagram in which only partial electronic units, scan lines, data lines are shown. However, the disclosure should not be limited to what is shown in FIG. 7A. The photodetecting device 7 may comprise other elements.

As shown in FIG. 7A, each of the first electronic unit 710-1, the second electronic unit 710-2, the third electronic unit 710-3 and the fourth electronic unit 710-4 may comprise a photodiode (e.g. the first photodiode 711-1, the second photodiode 711-2, the third photodiode 711-3, and the fourth photodiode 711-4), a reset transistor (e.g. the first reset transistor 712-1, the second reset transistor 712-2, the third reset transistor 712-3, and the fourth reset transistor 712-4), an amplification transistor (e.g. the first amplification transistor 713-1, the second amplification transistor 713-2, the third amplification transistor 713-3, and the fourth amplification transistor 713-4), and a readout transistor (e.g. the first readout transistor 714-1, the second readout transistor 714-2, the third readout transistor 714-3, and the fourth readout transistor 714-4), but the disclosure should not be limited thereto. The elements (e.g. photodiode, reset transistor, amplification transistor and readout transistor) of the first photodiode 711-1, the second photodiode 711-2, the third photodiode 711-3, and the fourth photodiode 711-4 are similar to or the same as the elements of the first photodiode 411-1, the second photodiode 411-2, the third photodiode 411-3, and the fourth photodiode 411-4, therefore, the detail for the connection relationships of the elements of FIG. 7A will not be discussed more below. A main difference between the photodetecting device 4 and the photodetecting device 7 is that one end of each of the first reset transistor 712-1, the second reset transistor 712-2, the third reset transistor 712-3, and the fourth reset transistor 712-4 is changed to be electrically connected to the Vreset line C4. In other words, the reset transistors (the first reset transistor 712-1, the second reset transistor 712-2, the third reset transistor 712-3, and the fourth reset transistor 712-4) and the amplification transistors (the first amplification transistor 713-1, the second amplification transistor 713-2, the third amplification transistor 713-3, and the fourth amplification transistor 713-4) are not electrically connected to the Vdd line (the first Vdd line C3-1 and second Vdd line C3-2) together. The advantage of this configuration is that the Vdd line (e.g. the first Vdd line C3-1 and second Vdd line C3-2) and the Vreset line C4 may receive and transmit different DC voltage to increase the flexibility of the driving design of the photodetecting device 7. Specifically, as shown in FIG. 7A, the first amplification transistor 713-1 and the third amplification transistor 713-3 may be electrically connected to the first Vdd line C3-1, and the second amplification transistor 713-2 and the fourth amplification transistor 713-4 may be electrically connected to the second Vdd line C3-2. Each amplification transistor (the first amplification transistor 713-1, the second amplification transistor 713-2, the third amplification transistor 713-3, and the fourth amplification transistor 713-4) may be electrically connected to corresponding readout transistor (e.g. the first readout transistor 714-1, the second readout transistor 714-2, the third readout transistor 714-3, and the fourth readout transistor 714-4) respectively. The gate of the first readout transistor 714-1 and the gate of the second readout transistor 714-2 may be electrically connected to the first scan line G1, and the gate of the third readout transistor 714-3 and the gate of the fourth readout transistor 714-4 may be electrically connected to the second scan line G2. One end (e.g. source or drain) of each of the first readout transistor 714-1 and the third readout transistor 714-3 may be electrically connected to the first data line D1, and one end (e.g. source or drain) of each of the second readout transistor 714-2 and the fourth readout transistor 714-4 may be electrically connected to the second data line D2. One end (e.g. source or drain) of each of the first reset transistor 712-1, the second reset transistor 712-2, the third reset transistor 712-3, and the fourth reset transistor 712-4 may be electrically connected to the Vreset line C4.

As shown in FIG. 7A, the first electronic unit 710-1 and the second electronic unit 710-2 are electrically connected to the first reset gate line C2-1, and the third electronic unit 710-3 and the fourth electronic unit 710-4 are electrically connected to the second reset gate line C2-2. The first electronic unit 710-1 and the third electronic unit 710-3 are electrically connected to the first bias line C1-1 and the first Vdd line C3-1, and the second electronic unit 710-2 and the fourth electronic unit 710-4 are electrically connected to the second bias line C1-2 and the second Vdd line C3-2. The first electronic unit 710-1, the second electronic unit 710-2, the third electronic unit 710-3 and the fourth electronic unit 710-4 may share the Vreset line C4. Therefore, in the photodetecting device 7, only one Vreset line C4 need to be disposed for the first electronic unit 410-1, the second electronic unit 410-2, the third electronic unit 410-3 and the fourth electronic unit 410-4.

Figure 7B:
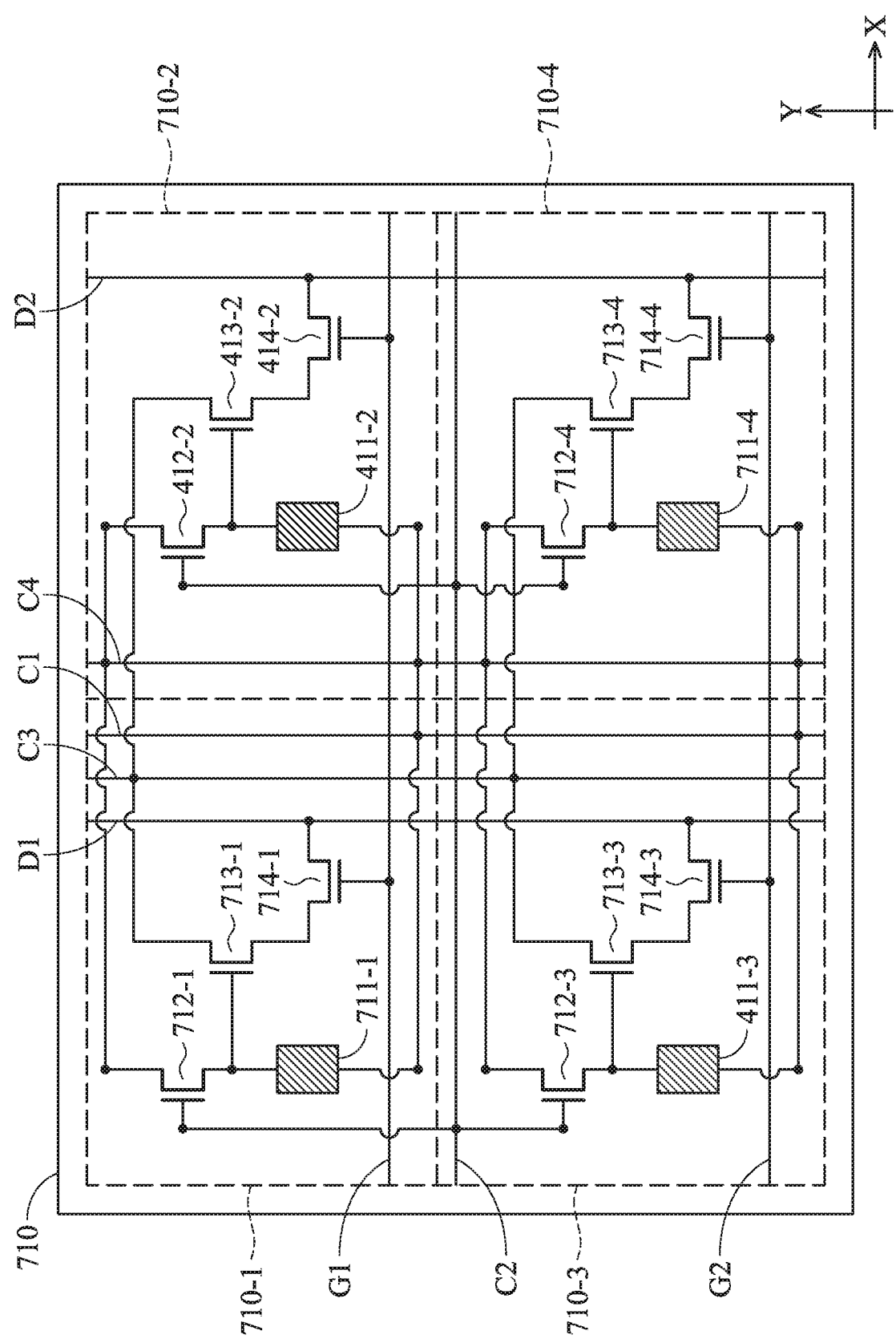
FIG. 7B is a schematic diagram of a photodetecting device 7 according to another embodiment of the disclosure

According to another embodiment of the disclosure, the first electronic unit 710-1, the second electronic unit 710-2, the third electronic unit 710-3 and the fourth electronic unit 710-4 also may share a bias line C1, a reset gate line C2 or an Vdd line C3, but the disclosure should not be limited thereto. According to another embodiment of the disclosure, the first electronic unit 710-1, the second electronic unit 710-2, the third electronic unit 710-3 and the fourth electronic unit 710-4 also may share multiple of the bias line C1, the reset gate line C2, the Vdd line C3 and the Vreset line C4 or share all of the bias line C1, the reset gate line C2, the Vdd line C3 and the Vreset line C4. For example, in some embodiments, the first electronic unit 710-1, the second electronic unit 710-2, the third electronic unit 710-3 and the fourth electronic unit 710-4 may share a bias line C1 and reset gate line C2. In some embodiments, the first electronic unit 710-1, the second electronic unit 710-2, the third electronic unit 710-3 and the fourth electronic unit 710-4 may share a bias line C1, a bias line C1, a reset gate line C2, a Vdd line C3 and a Vreset line C4 (as shown in FIG. 7B). Specifically, the gates of the first reset transistor 712-1, the second reset transistor 712-2, the third reset transistor 712-3, and the fourth reset transistor 712-4 may be electrically connected to the reset gate line C2. One end of each of the first photodiode 711-1, the second photodiode 711-2, the third photodiode 711-3, and the fourth photodiode 711-4 may be connected to the bias line C1. One end (source or drain) of each of the first reset transistor 712-1, the second reset transistor 712-2, the third reset transistor 712-3, and the fourth reset transistor 712-4 may be electrically connected to the Vreset line C4. One end (source or drain) of each of the first amplification transistor 713-1, the second amplification transistor 713-2, the third amplification transistor 713-3, and the fourth amplification transistor 713-4 may be electrically connected to the Vdd line C3. Therefore, in the embodiment of FIG. 7B, in the photodetecting device 7, for the first electronic unit 710-1, the second electronic unit 710-2, the third electronic unit 710-3 and the fourth electronic unit 710-4, only one bias line C1, one reset gate line C2, one Vdd line C3 and one Vreset line C4 need to be configured. In the embodiment, in the photodetecting device 7, the common lines (e.g. the bias line C1, the Vdd line C3 and the Vreset line C4) may be disposed between the first electronic unit 710-1 and the second electronic unit 710-2. In the embodiment, in the photodetecting device 7, the common line (e.g. the reset gate line C2) may be disposed between the first electronic unit 710-1 and the third electronic unit 710-3, but the disclosure should not be limited thereto. In the above configuration, the layout area for the lines can be reduced. Therefore, the space for the photodiode and the detection sensitivity will be increased.

Figure 8:
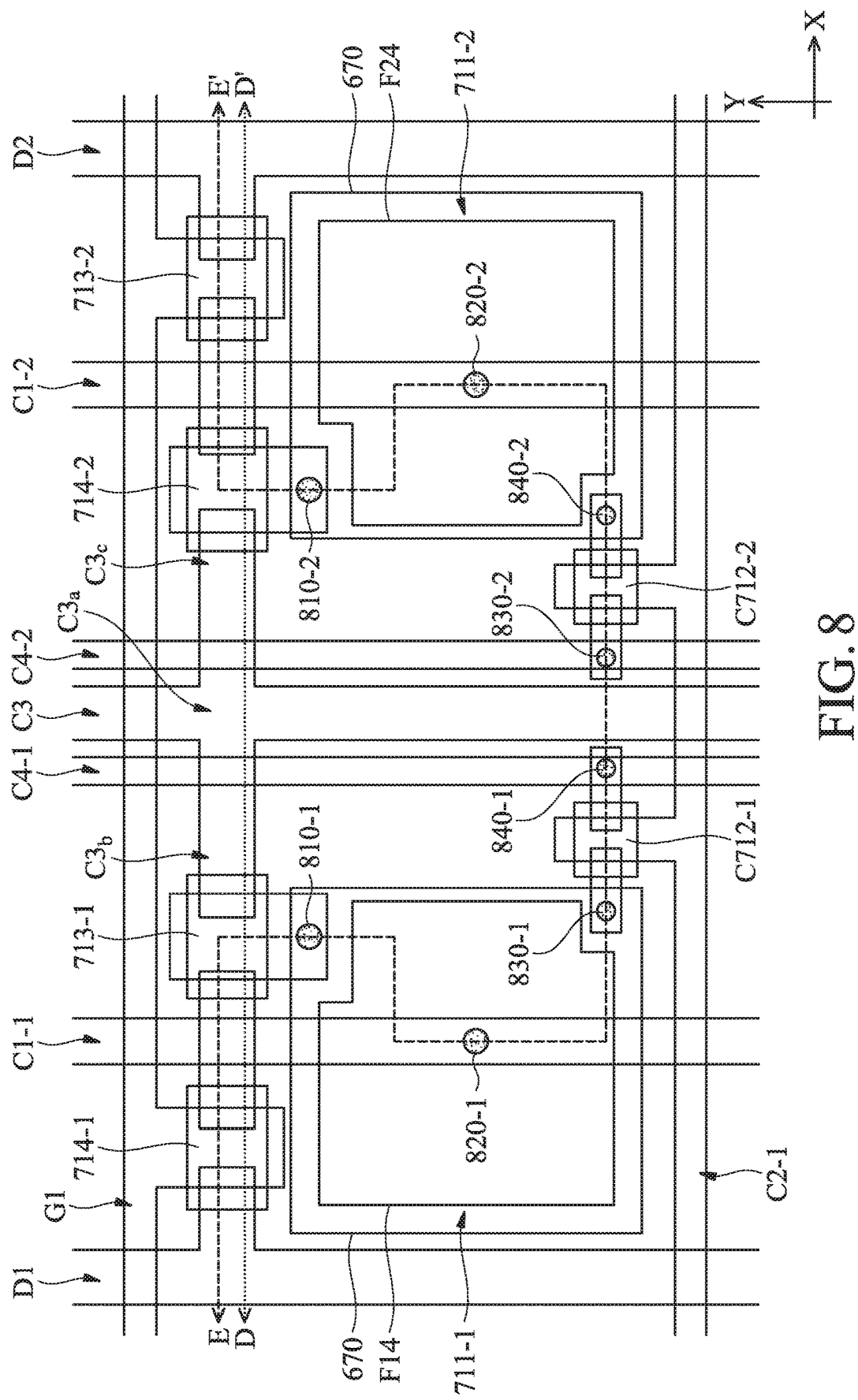
FIG. 8 is a top view diagram of two adjacent electronic units of the photodetecting device 7 according to an embodiment of the disclosure.

FIG. 8 is a top view diagram of two adjacent electronic units of the photodetecting device 7 according to an embodiment of the disclosure.

As shown FIG. 8, the first electronic unit 710-1 comprises the first photodiode 711-1, the first reset transistor 712-1, the first amplification transistor 713-1, the first readout transistor 714-1, a contact hole 810-1, a contact hole 820-1, a contact hole 830-1 and a contact hole 840-1. The second electronic unit 710-2 comprises the second photodiode 711-2, the second reset transistor 712-2, the second amplification transistor 713-2, the second readout transistor 714-2, a contact hole 810-2, a contact hole 820-2, a contact hole 830-2 and a contact hole 540-2.

In the embodiment of FIG. 8, the common Vdd line C3 may extend in the second direction Y, and therefore, the adjacent electronic units along the first direction X (e.g. the first electronic unit 710-1 and the second electronic unit 710-2) may be designed for mirror symmetry along the first direction X, but the disclosure should not be limited thereto. The first electronic unit 710-1 and the second electronic unit 710-2 may be disposed between the first data line D1 and the second data line D2.

Furthermore, as shown in FIG. 8, the common Vdd line C3 may have a main part $C3_a$, a first branch part $C3_b$ and a second branch part $C3_c$. The main part $C3_a$ is connected to the first branch part C3$_b$ and the second branch part C3$_c$. From a top view of the array substrate 710, the first branch part C3$_b$ and the second branch part C3$_c$ may partially overlap the first electronic unit 710-1 and the second electronic unit 710-2, respectively, to electrically connect the Vdd line C3 to the first electronic unit 710-1 (e.g. electrically connecting it to the first amplification transistor 713-1 of the first electronic unit 710-1) and the second electronic unit 710-2 (e.g. electrically connecting it to the second amplification transistor 713-2 of the second electronic unit 710-2).

According to another embodiment of the disclosure, if the common line (e.g. the reset gate line C2) extends in the first direction X, the first branch part and the second branch part of the common line may partially overlap the first electronic unit 710-1 and the third electronic unit 710-3 respectively to electrically connect the common line to the first electronic unit 710-1 (e.g. electrically connecting it to the first reset transistor 712-1 of the first electronic unit 710-1) and the third electronic unit 710-3 (e.g. electrically connecting it to the third reset transistor 712-3 of the second electronic unit 710-3).

Furthermore, from a top view of the array substrate 710, the shape of the first branch part C3$_b$ may be the same as or different than the shape of the second branch part C3$_c$, but the disclosure should not be limited thereto. It should be noted that the "mirror symmetry" in the disclosure does not mean that the size or shape of all the elements are the same. The "mirror symmetry" may mean that the relative locations of similar elements in the electronic units are disposed for mirror symmetry.

Figure 9A:
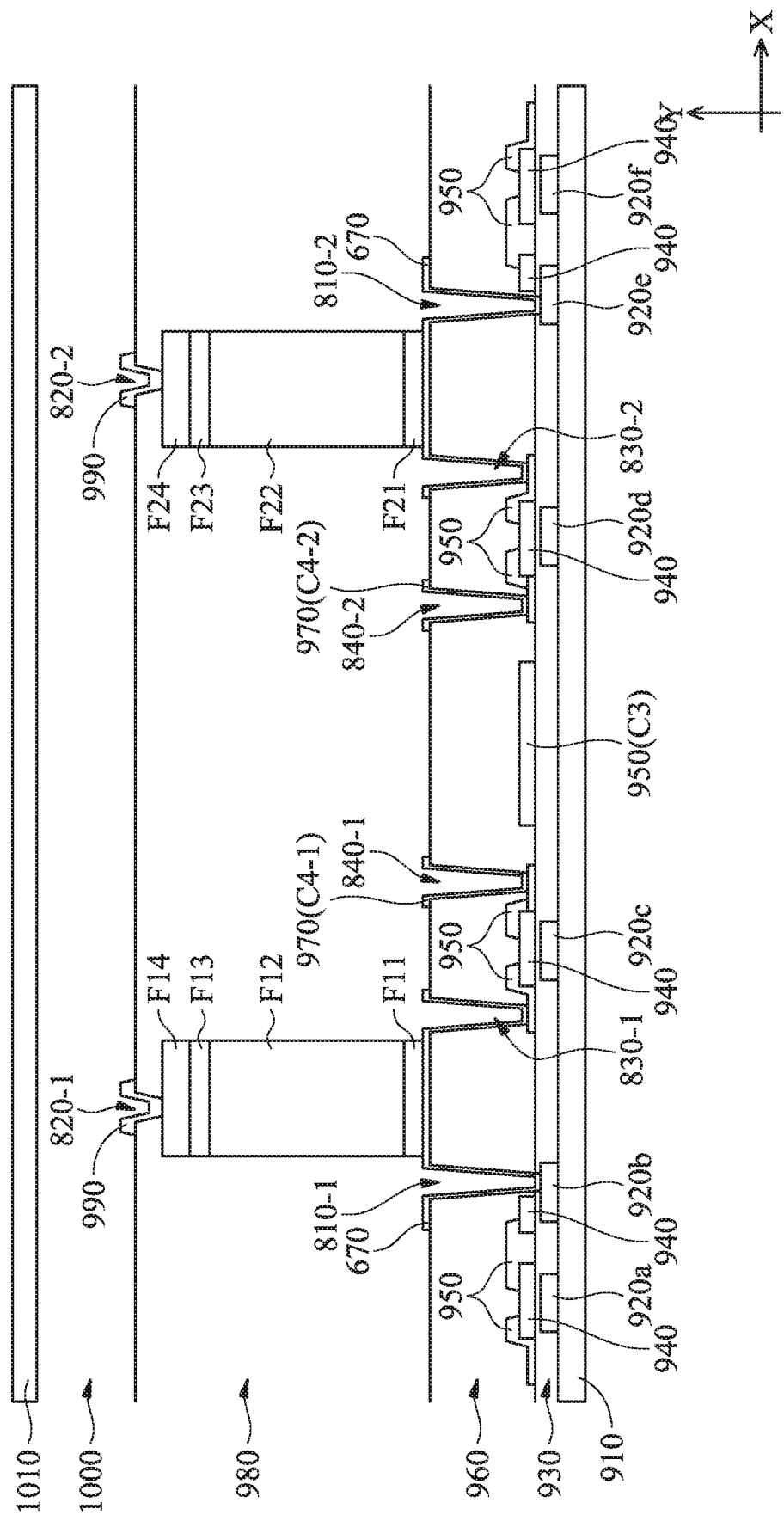
FIG. 9A is a profile diagram of the E-E' section (represented by dashed line) of the two adjacent electronic units of the photodetecting device 7 according to an embodiment of the disclosure.

FIG. 9A is a profile diagram of the E-E' section (represented by dashed line) of the two adjacent electronic units of the photodetecting device 7 according to an embodiment of the disclosure.

As shown in FIG. 9A, a first metal layer 920 is formed on the substrate 910. The first metal layer 920 may be patterned (e.g. photolithography manufacturing process, etching process manufacturing process, but the disclosure should be not limited thereto) to form a gate 920a of the first readout transistor 714-1, a gate 920b of the first amplification transistor 713-1, a gate 920c of the first reset transistor 712-1, a gate 920d of the second reset transistor 712-2, a gate 920e of the second amplification transistor 713-2, a gate 920f of the second readout transistor 714-2, the first scan line G1, the second scan line G2 or other scan lines, but the disclosure should be not limited thereto. Then, a gate insulation layer 930 is formed on the first metal layer 920. Then, an amorphous-silicon layer 940 and a second metal layer 950 are formed on the gate insulation layer 930 in sequence. The second metal layer 950 may be patterned to form the sources and drains of a plurality of transistors (which comprise the first reset transistor 712-1, the second reset transistor 712-2, the first amplification transistor 713-1, the second amplification transistor 713-2, the first readout transistor 714-1 and the second readout transistor 714-2), the Vdd line C3, the first data line D1, the second data line D2 or other data lines, but the disclosure should be not limited thereto. In other embodiments of the disclosure, the Vdd line C3 may be a conductive layer of other layers (comprising the metal layer). Then, the first interlayer dielectric (ILD) layer 960 is formed on the second metal layer 950. Then, the first ILD layer 960 is patterned to form a plurality of through holes, and a third metal layer 970 is deposited on the first ILD layer 960 in such a way that it fills in the through holes to form a plurality of contact holes (which comprise contact hole 810-1, contact hole 830-1, contact hole 840-1, contact hole 810-2, contact hole 830-2, and contact hole 840-2, but the disclosure should not be limited thereto). The third metal layer 970 is patterned to form the bottom electrode of the first electronic unit 710-1 and form the bottom electrode of the second electronic unit 710-2. In addition, the third metal layer 970 is patterned to form the first Vreset line C4-1 and the second Vreset line, but the disclosure should not be limited thereto.

Then, the first photodiode 911-1 and the second photodiode 911-2 are formed on the third metal layer 970. The first photodiode 911-1 may comprise a first semiconductor layer F11, a second semiconductor layer F12 and a third semiconductor layer F13 from bottom to top, and the second photodiode 911-2 may comprises a first semiconductor layer F21, a second semiconductor layer F22 and a third semiconductor layer F23 from bottom to top. In some embodiments, the first semiconductor layer F11 and the first semiconductor layer F21 may be N-type doping layers, the second semiconductor layer F12 and the second semiconductor layer F22 may be intrinsic layers and the third semiconductor layer F13 and the third semiconductor layer F23 may be P-type doping layers. In some embodiments, the first semiconductor layer F11 and the first semiconductor layer F21 may be P-type and the third semiconductor layer F13 and the third semiconductor layer F23 may be N-type doping layers.

A conductive layer is formed on the third semiconductor layer F13 and the third semiconductor layer F23, and the conductive layer is patterned to form the conductive layer F14 and the conductive layer F24. The conductive layer F14 and the conductive layer F24 are respectively used to be the top electrode of the first photodiode 911-1 and the top electrode of the second photodiode 911-2. Then, a second ILD layer 980 is formed on the first photodiode 911-1 and the second photodiode 911-2. The second ILD layer 980 is patterned to form a plurality of through holes, and a fourth metal layer 990 is deposited on the second ILD layer 980 in such a way that it fills in the through holes to form a plurality of contact holes (which comprise contact hole 820-1 and contact hole 820-2). Then, a third ILD layer 1000 is formed on the fourth metal layer 990. In some embodiments, the photodetecting device 7 may further comprise a scintillator layer 1010. The scintillator layer 1010 is adjacent to the substrate 910. Specifically, the scintillator layer 1010 is formed on the third ILD layer 1000.

Figure 9B:
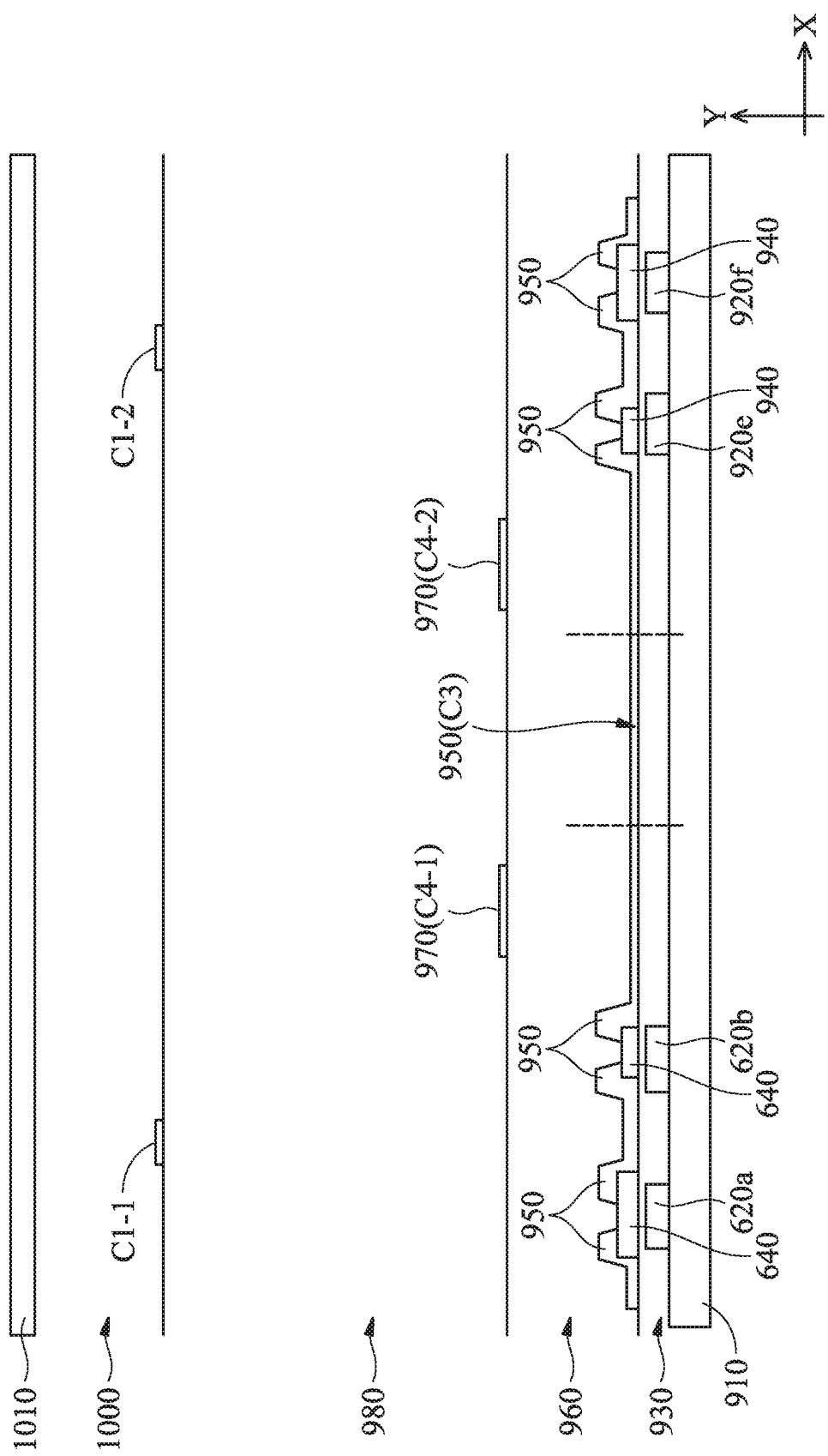
FIG. 9B is a profile diagram of the D-D' section (represented by dashed line) of the two adjacent electronic units of the photodetecting device 7 according to an embodiment of the disclosure.

FIG. 9B is a profile diagram of the D-D' section (represented by dashed line) of the two adjacent electronic units of the photodetecting device 7 according to an embodiment of the disclosure. As shown in FIG. 9B, the first bias line C1-1 and the second bias line C1-2 are formed on the second ILD layer 980 and the first electronic unit 710-1 and the second electronic unit 710-2 may share the Vdd line C3.

According to the embodiments of the disclosure, the common line (e.g. bias line C1, reset gate line C2, Vdd line C3, or Vreset line, but the disclosure should not be limited thereto) is separated from non-common line (the data line, scan line or other line) by at least one interlayer dielectric (ILD) layer to reduce short-circuit between the different lines at line crossing areas. For example, the array substrate 710 may further comprise ILD layer, the ILD layer is disposed between the common line (e.g. bias line C1, reset gate line C2, Vdd line C3, or Vreset line, but the disclosure should not be limited thereto) and the first scan line G1, or between the common line and the second line G2. Furthermore, the different types of common lines (e.g. bias line C1, reset gate line C2, Vdd line C3, or Vreset line, but the disclosure should not be limited thereto) may be separated by at least one ILD layer at line crossing area(s).

For example, as shown in FIG. 3, the common bias line C1 is separated from the first scan line G1 (not shown in FIG. 3, but the first scan line G1 and the first metal line 320 are in the same layer) by the first ILD layer 350 and the second ILD layer 370, but the disclosure should not be limited thereto.

The above manufacturing process methods in the disclosure are only for example, but the disclosure should not be limited thereto. The manufacturing process method may be adjusted according to the requirement. The transistors (e.g. amplification transistor, readout transistor and reset transistor) in the embodiments of the disclosure are only taken bottom-gate-type transistor for example, but in other embodiments, the transistors (e.g. amplification transistor, readout transistor and reset transistor) can be top-gate-type transistor. Furthermore, the disclosure only takes the amorphous-silicon type transistor for example, but the disclosure should not be limited thereto. In other embodiments, the types of the transistor may be Low Temperature Poly-Silicon (LTPS), Indium Gallium Zinc Oxide (IGZO) or other appropriate types.

According to the photodetecting devices provided in the embodiments of the disclosure, an electronic unit in the photodetecting device can be share at least common line (e.g. bias line, reset gate line, Vdd line, or Vreset line, but the disclosure should not be limited thereto) with the adjacent electronic units to reduce the number of the lines in the photodetecting device or reduce the layout area in the photodetecting device. Therefore, the space for the photodiode can be increased and the detection sensitivity can be increased.

Reference throughout this specification to "one embodiment" or "an embodiment" means that a particular feature, structure, or characteristic described in connection with the embodiment is included in at least one embodiment of the disclosure, but do not denote that they are present in every embodiment. Thus, the appearances of the phrases "in one embodiment" or "in an embodiment" in various places throughout this specification are not necessarily referring to the same embodiment of the disclosure.

The above paragraphs describe many aspects. Obviously, the teaching of the disclosure can be accomplished by many methods, and any specific configurations or functions in the disclosed embodiments present a representative condition. Those who are skilled in this technology will understand that all of the disclosed aspects in the disclosure can be applied independently or be incorporated.

While the disclosure has been described by way of example and in terms of embodiment, it is to be understood that the disclosure is not limited thereto. Those who are skilled in this technology can still make various alterations and modifications without departing from the scope and spirit of this disclosure. Therefore, the scope of the present disclosure shall be defined and protected by the following claims and their equivalents.

What is claimed is:

1. A photodetecting device, comprising:
   an array substrate, which comprises:
   a first scan line, extending in a first direction;
   a first data line, extending in a second direction, wherein first data line is crossed with the first scan line;
   a first electronic unit, electrically connected to the first scan line and the first data line;
   a second electronic unit, adjacent to the first electronic unit and disposed along the first direction;
   a third electronic unit, adjacent to the first electronic unit and disposed along the second direction; and
   a common line, transmitting a signal to the first electronic unit, the second electronic unit and the third electronic unit,
   wherein the common line is disposed between the first electronic unit and the second electronic unit, or between the first electronic unit and the third electronic unit.

2. The photodetecting device of claim 1, further comprising:
   a second data line, wherein the first data line and the second data line are disposed along the first direction in sequence,
   wherein the first common line extends in the second direction, and the first electronic unit and the second electronic unit are disposed between the first data line and the second data line.

3. The photodetecting device of claim 1, further comprising:
   a second scan line, wherein the first data line and the second data line are disposed along the second direction in sequence,
   wherein the first common line extends in the first direction, and the first electronic unit and the third electronic unit are disposed between the first scan line and the second scan line.

4. The photodetecting device of claim 1, wherein the first common line comprises a main part, a first branch part and a second branch part, wherein the main part is connected to the first branch part and the second branch part, and the first branch part and the second branch part are disposed in both sides of the main part respectively.

5. The photodetecting device of claim 4, wherein the first branch part and the second branch part are electrically connected to the first electronic unit and the second electronic unit respectively, or are electrically connected to the first electronic unit and the third electronic unit respectively.

6. The photodetecting device of claim 5, wherein the first branch part and the second branch part are electrically connected to the first electronic unit and the second electronic unit, respectively, through two contact holes or are electrically connected to the first electronic unit and the third electronic unit, respectively, through two contact holes.

7. The photodetecting device of claim 1, wherein the array substrate further comprises a second common line, wherein the second common line transmits a signal to the first electronic unit, the second electronic unit and the third electronic unit, and wherein the second common line is disposed between the first electronic unit and the second electronic unit, or between the first electronic unit and the third electronic unit.

8. The photodetecting device of claim 7, wherein the second common line functions as one of a bias line, a power source voltage line, a reset line, or a voltage reset line, and the first common line functions as another one of a bias line, a power source voltage line, a reset line, or a voltage reset line.

9. The photodetecting device of claim 1, wherein the array substrate further comprises an interlayer dielectric (ILD) layer, and the ILD layer is disposed between the first common line and the first scan line, or between the first common line and the first data line.

10. The photodetecting device of claim 1, wherein the photodetecting device further comprises a scintillator layer, and the scintillator layer is adjacent to the array substrate.

* * * * *